DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 421

T896,026

POLYESTERAMIDES OF p-AMINOMETHYL-PHENOLS

Bernard C. Cossar, Pittsford, and Frederick L. Hamb, Rochester, N.Y. (both of 1669 Lake Ave., Rochester, N.Y. 14650)

Filed Feb. 1, 1971, Ser. No. 111,756

Int. Cl. C08g *20/30*

U.S. Cl. 96—87

No Drawing. 24 Pages Specification

High molecular weight, film forming polyesteramides of p-aminomethylphenols and dicarboxylic acids are readily convertible into photographic film bases. The polyesteramides of this invention have an inherent viscosity of from about .30 to about 1.00.